(12) United States Patent
Wessling

(10) Patent No.: US 7,947,199 B2
(45) Date of Patent: *May 24, 2011

(54) CONDUCTIVE POLYMERS CONSISTING OF ANISOTROPIC MORPHOLOGY PARTICLES

(75) Inventor: Bernhard Wessling, Bargteheide (DE)

(73) Assignee: Ormecon GmbH, Ammersbek (DE)

( * ) Notice: Subject to any disclaimer, the term of this patent is extended or adjusted under 35 U.S.C. 154(b) by 96 days.

This patent is subject to a terminal disclaimer.

(21) Appl. No.: 11/817,539

(22) PCT Filed: Mar. 1, 2006

(86) PCT No.: PCT/EP2006/001872
§ 371 (c)(1),
(2), (4) Date: Nov. 14, 2007

(87) PCT Pub. No.: WO2006/092292
PCT Pub. Date: Sep. 8, 2006

(65) Prior Publication Data
US 2008/0265215 A1 Oct. 30, 2008

(30) Foreign Application Priority Data
Mar. 2, 2005 (DE) .................... 10 2005 010 162

(51) Int. Cl.
H01B 1/00 (2006.01)
(52) U.S. Cl. ...... 252/500; 524/223; 528/495; 252/519.1
(58) Field of Classification Search .......... 252/500, 252/519, 519.1; 264/140; 428/364; 526/348; 528/193, 495; 524/800, 233
See application file for complete search history.

(56) References Cited

U.S. PATENT DOCUMENTS

| 3,977,756 | A | | 8/1976 | Rodondi |
| 4,394,498 | A | * | 7/1983 | Kastelic ................ 528/193 |
| 4,585,695 | A | * | 4/1986 | Ogasawara et al. ......... 428/364 |
| 4,657,632 | A | | 4/1987 | Holtzman et al. |
| 4,929,388 | A | | 5/1990 | Wessling |
| 4,959,180 | A | * | 9/1990 | Armes et al. ............ 252/519.34 |
| 5,104,599 | A | * | 4/1992 | Prevorsek et al. .......... 264/140 |
| 5,192,835 | A | | 3/1993 | Bull et al. |

(Continued)

FOREIGN PATENT DOCUMENTS

CA 2000431 4/1990

(Continued)

OTHER PUBLICATIONS

Kim et al., "Size Control of Polyaniline Nanoparticle by Polymer Surtactant", May 24, 2002, Macromolecules, vol. 35, pp. 5314-5316.*

(Continued)

Primary Examiner — Mark Kopec
Assistant Examiner — Khanh Tuan Nguyen
(74) Attorney, Agent, or Firm — Swanson & Bratschun, L.L.C.

(57) ABSTRACT

The present invention relates to a conductive polymer or organic metal which is characterized in that nanoscopic particles formed from same with a particle size of less than 100 nm have an anisotropic morphology which is not spherical and has a length-to-diameter ("L/D") ratio greater than 1.2. The invention also relates to a process for the preparation of such polymers and their use in the preparation of shaped parts, self-supporting foils or coatings with electrical conductivity, in particular on anisotropic substrates or in anisotropic media and fields.

8 Claims, 6 Drawing Sheets

U.S. PATENT DOCUMENTS

| | | | | |
|---|---|---|---|---|
| 5,278,213 A * | 1/1994 | Han et al. | | 524/233 |
| 5,281,363 A * | 1/1994 | Shacklette et al. | | 252/500 |
| 5,403,913 A * | 4/1995 | MacDiarmid et al. | | 528/495 |
| 5,498,761 A | 3/1996 | Wessling et al. | | |
| 5,532,025 A | 7/1996 | Kinlen et al. | | |
| 5,567,355 A | 10/1996 | Wessling et al. | | |
| 5,595,689 A * | 1/1997 | Kulkarni et al. | | 252/500 |
| 5,645,890 A | 7/1997 | MacDiarmid et al. | | |
| 5,720,903 A * | 2/1998 | Wessling et al. | | 252/500 |
| 5,846,606 A | 12/1998 | Wessling | | |
| 5,922,466 A | 7/1999 | Angelopoulos et al. | | |
| 6,015,482 A | 1/2000 | Stern | | |
| 6,015,613 A | 1/2000 | Kinlen et al. | | |
| 6,123,995 A | 9/2000 | Sonnenberg et al. | | |
| 6,194,087 B1 | 2/2001 | Huhn et al. | | |
| 6,361,823 B1 | 3/2002 | Bokisa et al. | | |
| 6,459,564 B1 | 10/2002 | Watanabe et al. | | |
| 6,592,020 B1 | 7/2003 | Currie et al. | | |
| 6,632,380 B1 | 10/2003 | Wessling | | |
| 6,773,568 B2 | 8/2004 | Egli et al. | | |
| 6,784,530 B2 | 8/2004 | Sugaya et al. | | |
| 6,821,323 B1 | 11/2004 | Bell et al. | | |
| 6,962,642 B2 | 11/2005 | Knadle et al. | | |
| 7,018,866 B2 | 3/2006 | Sugaya et al. | | |
| 7,087,441 B2 | 8/2006 | Konrad et al. | | |
| 7,105,221 B2 | 9/2006 | Akamatsu et al. | | |
| 7,396,596 B2 | 7/2008 | Wessling | | |
| 7,547,479 B2 | 6/2009 | Wessling | | |
| 7,683,124 B2 * | 3/2010 | Wessling | | 524/800 |
| 2002/0110701 A1 | 8/2002 | Wehrmann et al. | | |
| 2002/0187364 A1 | 12/2002 | Heber et al. | | |
| 2003/0075270 A1 | 4/2003 | Landi et al. | | |
| 2004/0021131 A1 | 2/2004 | Blanchet-Fincher et al. | | |
| 2004/0060729 A1 | 4/2004 | Knadle et al. | | |
| 2004/0086697 A1 | 5/2004 | Egli et al. | | |
| 2004/0191605 A1 | 9/2004 | Kinkelaar et al. | | |
| 2006/0035105 A1 | 2/2006 | Wessling | | |
| 2007/0142595 A1 * | 6/2007 | Hashiba et al. | | 526/348 |
| 2007/0267747 A1 | 11/2007 | Wessling | | |
| 2007/0275159 A1 | 11/2007 | Wessling | | |
| 2008/0265215 A1 | 10/2008 | Wessling | | |
| 2009/0154059 A1 | 6/2009 | Wessling et al. | | |
| 2010/0012359 A1 | 1/2010 | Wessling | | |
| 2010/0133478 A1 | 6/2010 | Wessling | | |
| 2010/0140592 A1 | 6/2010 | Wessling | | |
| 2010/0193573 A1 | 8/2010 | Wessling | | |

FOREIGN PATENT DOCUMENTS

| | | |
|---|---|---|
| CA | 2553467 | 8/2005 |
| DE | 37 29 566 | 3/1989 |
| DE | 42 38 765 | 5/1994 |
| DE | 4317010 A1 | 11/1994 |
| DE | 43 33 127 A1 | 3/1995 |
| DE | 198 12 258 A1 | 9/1999 |
| DE | 695 23 755 T2 | 8/2002 |
| DE | 698 07 230 T2 | 4/2003 |
| DE | 102 34 363 | 2/2004 |
| DE | 699 13 605 T2 | 9/2004 |
| DE | 699 13 247 T2 | 10/2004 |
| DE | 102004003784 | 8/2005 |
| DE | 20 2005 010364 | 10/2005 |
| DE | 10 2004 030 388 | 1/2006 |
| DE | 10 2004 030 930 | 2/2006 |
| DE | 10 2007 040 065.0 | 2/2009 |
| EP | 0329768 | 8/1989 |
| EP | 0 407 492 B1 | 10/1989 |
| EP | 0 466 943 | 9/1991 |
| EP | 0 700 573 B1 | 4/1994 |
| EP | 0 807 190 B1 | 11/1996 |
| EP | 0329768 | 11/1996 |
| EP | 1 391 536 A2 | 2/1997 |
| EP | 0 656 958 B1 | 4/1999 |
| EP | 1 061 530 | 5/2000 |
| EP | 1061530 | 12/2000 |
| EP | 0 767 974 | 11/2001 |
| EP | 0 993 512 | 8/2002 |
| EP | 0 962 486 | 12/2003 |
| EP | 0 962 943 | 12/2003 |
| EP | 1 477 587 | 11/2004 |
| EP | 1 595 908 | 11/2005 |
| GB | 2 126 250 | 3/1984 |
| JP | 2002/289653 | 10/2002 |
| JP | 2003/129278 | 5/2003 |
| JP | 2003-277417 | * 10/2003 |
| JP | 2003/332391 | 11/2003 |
| WO | WO 89/02155 | 3/1989 |
| WO | WO 94/27297 | 11/1994 |
| WO | WO 95/00678 | 1/1995 |
| WO | WO 95/09255 | 4/1995 |
| WO | WO 97/20084 | 6/1997 |
| WO | WO 99/05687 | 2/1999 |
| WO | WO 02/074534 | 9/2002 |
| WO | WO 2004/016698 | 2/2004 |
| WO | WO 2004/029128 | 4/2004 |
| WO | WO 2004/029133 | 4/2004 |
| WO | WO 2004/029176 | 4/2004 |
| WO | WO 2004-083283 A1 * | 9/2004 |
| WO | WO 2005/070972 | 8/2005 |

OTHER PUBLICATIONS

Gospodinova et al., "A new route to polyaniline composites", Feb. 1997, Polymer, vol. 38, pp. 743-746.*

Wessling et al. (2000) Eur. Phys. J. E 2:207-210, "Dispersion-induced insulator-to-metal transition in polyaniline".

Naarmann et al. (1987) Synthetic Metals 22:1-8, "New Process for the Production of Metal-Like, Stable Polyacetylene".

MacDiarmid et al. (Aug. 1994) Synthetic Metals 65(2-3):103-116, "The concept of secondary doping as applied to polyaniline".

Holland et al. (1996) J. Phys. Condens. Matter 8:2991-3002, "Conductivity studies of polyaniline doped with CSA".

Dufour et al. (2003) Synthetic Metals 135-136:63-68, "The role of chain and dopant engineering in the preparation of processible conducting polymers with desired properties".

Pomfret et al. (2000) Polymer 41:2265-2269, "Electrical and mechanical properties of polyaniline fibres produced by a one-step wet spinning process".

Zhou et al. (2001) J. Matr. Sci. 36(13):3089-3095, "Electrically conductive PANi multifilaments spun by a wet-spinning process".

Adams et al. (1998) J. Phys. Condens. Matter 10:8293-8303, "A new acid-processing route to polyaniline films which exhibit metallic conductivity and electrical transport strongly dependent upon intrachain molecular dynamics".

Mattes et al. (1997) Synthetic Metals 84:45-49, "Formation of conductive polyaniline fibers derived from highly concentrated emeraldine base solution".

Adams et al. (1999) Synthetic Metals 101:685-685, Paper No. 6074, "Temperature dependent conductivity behaviour of polyaniline fibres".

Kim, D. et al. (May 24, 2002), Macromolecules, vol. 35, pp. 5314-5316, "Size Control of Polyaniline Nanoparticle by Polymer Surfactant".

Gospodinova N et al (Feb. 1997), Polymer, vol. 38, No. 3, pp. 743-746, "A new route to polyaniline composites".

Kosina, S. et al. (1994) Journal of Materials Science, vol. 29, pp. 3403-3407, "Study on the electrical conductivity and morphology of porous polypyrrole layers prepared electrochemically in the presence of pyridinium chlorochromate".

Armes P et al (1987) Journal of the Chemical Society, Chemical Communications, pp. 288-290, "Dispersions of electrically Conducting Polypyrrole particles in aqueous media".

Wessling, B, et al. (2000) The European Physical Journal E, vol. 2, pp. 207-210, "Dispersion-induced insulator-to-metal transition in polyaniline".

Gabrielson, L. and Folkes, J. (Jan. 2001) Journal of Materials Science, vol. 36, No. 1, pp. 1-6, "Manufacture of colloidal polymer ellipsoids for anisotropic conducting nano-composites".

Keville, K.M. et al. (Jun. 1991) Journal of Colloid and Interface Science, vol. 144, No. 1, pp. 103-126, "Preparation and Characterization of Monodisperse Polymer Microspheroids".

Office Action dated Jun. 29, 2009 for related U.S. Appl. No. 10/597,170.

"Alternative Technologies for Surface Finishing—Cleaner Technology for Printed Wired Board Manufacturers", EPA, Office of Pollution Prevention and Toxics (Jun. 2001) EPA 744-R-01-001.

"Electric Double Layer Capacitors and Electric Power Storage Systems" The Nikkan Kogyo Simbun, Ltd. (English translation of relevant portion).

Aldissi et al. (1998) Conference Proceedings at ANTEC '98, vol. II, p. 1197-1201 "Conducting Polymers in Ultracapacitor Applications".

Arbizzani et al. (1996) Electrochimica Acta 41(I):21-26, "Polymer-Based Redox Supercapacitors: A Comparative Study".

Arici et al. (Mar. 2004), Thin Solid Films, 451-452:612-618, "Hybrid solar cells based on inorganic nanoclusters and conjugated polymers".

Brusic et al. (1997) J. Electrochem. Soc., 144:436-442, "Use of Polyaniline and Its Derivatives in Corrosion Protection of Copper and Silver".

Chen et al. (2003) Journal of Power Sources 117:273-282, "Electrochemical and capacitive properties of polyaniline-implanted porous carbon electrode for supercapacitors".

Du et al. (Mar. 1996) Presentation at the Meeting of the American Physical Society, Section M23, Presentation M 23 9 "Nonmetal-Metal Transition in Conducting Polyaniline Coated Carbon Blacks," Bulletin of the American Chemical Society, 41(1):557 (Abstract).

Harrison et al. (1992) Surface and Interface Analysis, 18:368-376, "The Determination of Uncertainties in Quantitative XPS/AES and its Impact on Data Acquisition Strategy".

International Search Report issued Feb. 18, 2008 in PCT Application Serial No. PCT/EP2007/007467.

Kiebooms et al., Handbook of advanced electronic and photonic materials and devices (2001), vol. 8, pp. 1-102, "Synthesis, Electrical, and Optical Properties of Conjugated Polymers".

LaForgue et al. (2001) Journal of The Electrochemical Society 148(10):A1130-A1134, "Hybrid Supercapacitors Based on Activated Carbons and Conducting Polymers".

Lin et al. (2003) Carbon 41:2865-2871, "A novel method for carbon modification with minute polyaniline deposition to enhance the capacitance of porous carbon electrodes".

Novak et al. (1997) Chemical Rev., 97:207-281, "Electrochemically active polymers for rechargeable batteries".

Office Action dated Jul. 26, 2006 for related U.S. Appl. No. 11/165,411.

Office Action dated Feb. 28, 2007 for related U.S. Appl. No. 11/165,411.

Office Action dated May 8, 2007 for related U.S. Appl. No. 11/165,411.

Office Action dated Jan. 23, 2008 for related U.S. Appl. No. 11/165,411.

Office Action dated Apr. 29, 2009 for related U.S. Appl. No. 11/757,190.

Office Action dated Nov. 4, 2009 for related U.S. Appl. No. 11/757,190.

Office Action dated Apr. 26, 2010 for related U.S. Appl. No. 11/757,190.

Office Action dated Oct. 7, 2009 for related U.S. Appl. No. 10/597,170.

Office Action dated May 26, 2010 for related U.S. Appl. No. 10/598,458.

Ormecon CSN process, Chemisch Zinn, Ormecon GmbH, Ammersbek.

Ormecon CSN process, Ormecon GmbH, Ammersbek.

Park et al. (2002) Journal of Power Sources 111:185-190, "Hybrid electrochemical capacitors based on polyaniline and activated carbon electrodes".

Parquet and Boggs (1995), Electronic Packaging & Productions, 9:38-42.

Posdorfer and Wesseling (2000) Ormecon GmbH, Ammersbek, Oxidation of copper in the presence of organic metal polyaniline.

Rudge (1994) Journal of Power Sources 47:89-107, "Conducting polymers as active materials in electrochemical capacitors".

Ryden et al. (Jan. 1968) Physics Letters 26A(5):209-210, Temperature Dependence of the Resistivity of Ru02 and Ir02.

Sarangapani et al. (1990) Journal of Power Sources 29:355-264, "Advanced Double Layer Capacitors".

Scofield (1976) Journal of Electron Spectroscopy and Related Phenomena, 8:129-137, "Hartree-slater Subshell Photoionization Cross-sections at 1254 and 1487 eV".

Stratmann et al. (1991) Ber. Bunsenges. Phys. Chem., 95:1365-1375, "Use of a Scanning-Kelvinprobe in the Investigation of Electrochemical Reactions at the Metal/Polymer Interface".

Stratmann et al. (1991) Corrosion Science, 32:467-470, "A New Technique Able to Measure Directly the Delamination of Organic Polymer Films".

Talbi et al. (2003) Journal of Applied Electrochemistry 33:465-473, "Electropolymerization of aniline on carbonized polyacrylonitrile aerogel electrodes: applications for supercapacitors".

Written Opinion issued in PCT Application Serial No. PCT/EP2007/007467.

International Preliminary Report on Patentablity issued Apr. 10, 2007 in PCT/EP2006/001872.

International Search Report issued Jul. 26, 2006 in PCT/EP2006/001872.

Office Action dated Oct. 4, 2010 for related U.S. Appl. No. 12/063,642.

Office Action issued Jan. 10, 2011 in U.S. Appl. No. 12/063,642.

* cited by examiner

CONDUCTIVE POLYMERS CONSISTING OF ANISOTROPIC MORPHOLOGY PARTICLES

RELATED APPLICATIONS

This application is a 35 U.S.C. §371 national phase application of PCT/EP2006/001872 (WO 2006/092292), filed on Mar. 1, 2006, entitled "Conductive Polymers Consisting Of Anisotropic Morphology Particles," which application claims priority to German Application Serial No. 102005010162.3, filed Mar. 2, 2005, each of which is specifically incorporated herein by reference in its entirety.

The present invention relates to conductive polymers consisting of particles having anisotropic morphology, a process for the preparation of same and their use for the preparation of shaped parts (moulded goods), foils or coatings.

The term conductive polymers, also "intrinsically conductive polymers" or "organic metals", is used to describe substances which are derived from low-molecular compounds (monomers), are at least oligomeric by polymerization, thus contain at least 3 monomer units which are linked by chemical bonding, have a conjugated π-electron system in the neutral (non-conductive) state and can be converted by oxidation, reduction or protonation (which is often described as "doping") into an ionic form, which is conductive. Conductivity is at least $10^{-7}$ S/cm.

In the case of doping by oxidation are used as doping agents e.g. iodine, peroxides, Lewis and proton acids or in the case of doping by reduction e.g. sodium, potassium, calcium.

Conductive polymers can also be of exceptionally varied chemical composition. For example acetylene, benzene, naphthalene, pyrrole, aniline, thiophene, phenylene sulphide, peri-naphthalene and others, and their derivatives, such as sulphoaniline, ethylene dioxythiophene, thienothiophene and others, and their alkyl or alkoxy derivatives or derivatives with other side groups, such as sulphonate, phenyl and other side groups, have proved themselves as monomers. Combinations of the above-named monomers can also be used as a monomer. For example aniline and phenylene sulphide are coupled and these A-B dimers then used as monomers. Depending on the aim, e.g. pyrrole, thiophene or alkylthiophenes, ethylene dioxythiophene, thienothiophene, aniline, phenylene sulphide and others can be connected to one another to form A-B structures and these then reacted to form oligomers or polymers. Alternatively two or more, e.g. three different monomers, can be jointly polymerized.

Most conductive polymers display a greater or lesser increase in conductivity as the temperature rises, which shows them to be non-metallic conductors. A few representatives of this class of substances show at least in a temperature range near to room temperature a metallic behaviour, in so far as conductivity falls as temperature rises. A further method of detecting metallic behaviour is in plotting the so-called "reduced activation energy" of conductivity against the temperature at low temperatures (to near 0 K). Conductors with a metallic contribution to conductivity show a positive pitch of the curve at low temperature. Such substances are called "organic metals".

Such an organic metal has been described by Welling et al. in Eur. Phys. J. E 2, 2000, 207-210. The transition from the state of a non-metallic to an at least partially metallic conductor was effected by a single-stage friction or dispersion process after the synthesis of the intrinsically conductive polymer was complete. Conductivity is also increased here by the dispersion process, without the chemical composition of the conductive polymer used having been substantially changed.

Numerous efforts to clearly increase conductivity can be found in the state of the art. In particular the strategy is used to create solutions of the conductive polymers (optionally using special doping agents), and then stretch the products obtained (films, fibres) after casting or other processing and subsequent drying.

In addition to Synthetic Metal (Special Issue, Vol. 65, Nos. 2-3, August 1994), a good overview of these processes is also given by the articles by Epstein et al. and Heeger et al. (Handbook of Conductive Polymers, Skotheim, Eisenbanner, Reynolds (ed.), M. Dekker, N.Y. 1998).

While a conductivity range of around and below 5 S/cm is normally achieved after synthesis, values of some tens, occasionally also some hundreds of S/cm are achieved by different procedures. Conductivity values of some thousands or tens of thousands S/cm, such as were achieved by Naarmann and Theophilou in Synthet. Met., 22, 1 (1987) 15 years ago with polyacetylene on the basis of a special polymerization process and subsequent stretching, have thus far not been able to be achieved with other conductive polymer systems. The process of Naarmann et al. has however the disadvantage that it is difficult to carry out and difficult to reproduce. Moreover, it leads to a product which is not air- and oxidation-stable and moreover cannot be further processed.

FIG. 3.2 in Kohlman and Epstein in the above-named handbook gives a very good overview of the conductivity values achieved thus far, wherein the higher values of $10^2$ S/cm are generally achieved only after stretching of a foil or fibre produced from the intrinsically conductive polymer.

In the case of polyaniline, the procedure is e.g. that aniline is polymerized in aqueous hydrochloric acid, wherein the chloride salt of the protonated polyaniline forms. This is neutralized by means of a strong base, e.g. ammonia, to remove HCl. The so-called emeraldine base is thereby obtained. This is dissolved with camphorsulphonic acid in the presence of toxic m-cresol in xylene or chloroform. Subsequently a film is cast from this solution and then stretched. After the stretching a conductivity of some $10^2$ S/cm is obtained.

This process, called secondary doping, see MacDiarmid and Epstein, Synth. Met. (Special Issue) Vol. 65, Nos. 2-3, August 1994, pp. 103-116, is carried out in numerous variants, i.a. in papers by Holland, Monkman et al. J. Phys. Condens. Matter 8 (1996), 2991-3002 or Dufour, Pron et al., Synth. Met. (2003), No. 133-136, pp. 63-68, wherein the acid and the secondary doping agent ("secondary dopant") are varied. Further papers by Monkman et al. are disclosed in: Polymer 41, 2265 (2000); J. Mater. Sci. 36(13), 3089-3095 (2001), Synth. Met. (102), 685 (1999); P N Adams et al. J. Phys.: Condens. *Matter* 10 8293-8303 (1998) with the title "A new acid-processing route to polyaniline films which exhibit metallic conductivity and electrical transport strongly dependent upon intrachain molecular dynamics".

In further variants of this process, Mattes et al., U.S. Pat. No. 6,123,883, produced fibres which also have a conductivity of some $10^2$ S/cm after stretching. Further papers in this direction by von Mattes et al. are disclosed in Synth. Metals 84, 45-49 (1997); U.S. Pat. No. 5,981,695 and WO 2004/042743 A1.

Common to all these papers is that they start from a molecular solution of the conductive polymers and after evaporation of the solvent it is attempted to stretch the chains of the polymer and thereby to orient them (parallel), i.e. align them. Quite clearly the conductivity can be increased by, say, a factor of 100 in this way and anisotropic effects (i.e., a preferred direction of conductivity or also of some optical properties, which is advantageous for some applications, not disadvantageous for others) also made possible.

However, if insoluble conductive polymers or organic metals are used in contrast to this, and these are therefore not processed from solution, but from a dispersion, a stretching cannot bring about an orientation of the dispersed nanoparticles with a subsequent increase in conductivity, not even an orientation of chains. The polymer particles (primary particles) are generally present in the dispersion in spherical form, i.e. in an isotropic structure (morphology). When these particles agglomerate, in particular when the dispersant is removed as layers form from the dispersion, a likewise isotropic secondary morphology then forms.

Recently, so-called "nanofibres" (English also "nanofibrils) made of polyaniline with which in principle an orientation and stretching would perhaps be conceivable have been presented in the technical literature. However, a closer investigation of these nanofibres shows that for their part they consist of spherical primary particles and on the one hand cannot be stretched and on the other hand do not have a particularly high initial conductivity (only a few S/cm). Moreover, the dimensions of the fibres (diameter 100-200 nm) in no way already justifies their inclusion in the "nano-world".

True nanofibres (with dimensions similar to those of carbon nanofibres, not to mention those with sufficiently high conductivity) based on conductive polymers are not known to date.

An increase of conductivity by stretching foils, films or fibres deposited from dispersions has therefore thus far not been possible (and thus nor has an increase in conductivity by stretching such products), any more than the arrangement, oriented from the outset in a preferred direction, of primary particles, as the hitherto available primary particles (nanoparticles) of conductive polymers and organic metals are essentially isotropic.

It is therefore an object of the present invention to create the possibility of orienting (aligning) the primary particles of conductive polymers or organic metals, i.e. to provide conductive polymers or organic metals with a morphology suitable for same.

The above object is achieved according to the invention by an intrinsically conductive polymer or organic metal which is characterized in that nanoscopic particles formed from the polymer with a particle size of less than 100 nm have an anisotropic morphology which is characterized in that it deviates from the sphere morphology and has a length-to-diameter ("L/D") ratio greater than 1.2.

Prior to their further processing to coatings, foils or sheets, the polymer particles according to the invention are generally obtained in the form of a stable dispersion which contains particles of at least an intrinsically conductive polymer, wherein the particle size is on average (weight) less than 1 µm, wherein the dispersant is a liquid at room temperature. After removal of the dispersant, a layer, foil or sheet formed from this dispersion generally has a conductivity of >100 S/cm.

The subject of the invention is also a process for the preparation of above-named polymer particles in which these are obtained in the form of a dispersion and in which, in this order (a) an intrinsically conductive polymer is prepared from monomers, wherein the temperature is controlled during polymerization such that it does not rise above a value more than 1° C. above the starting temperature, (b) the product from stage (a) is ground and/or dispersed in the presence of a non-electrically conductive, non-polymeric polar substance which is inert vis-à-vis the conductive polymer, optionally also in the presence of a non-conductive polymer, applying sufficient shearing forces, wherein the weight ratio between the conductive polymer and the polar substance is 2:1 to 1:10, the product from stage (b) is optionally dispersed in a further dispersant at a temperature below 250° C., preferably below 180° C. and particularly preferably at temperatures below 100° C., wherein the weight ratio between the conductive polymer and the dispersant is smaller than 1:10, wherein, in the case where the dispersion is carried out in the presence of a non-conductive polymer, the temperature does not exceed the mentioned limits and simultaneously lies 5 to at most 80° C. above the glass-transition point of the non-conductive polymer.

The process is conducted such that the particles obtain the morphology desired according to the invention, which can be checked by means of analytical methods such as scanning tunneling or scanning force microscopy and transmission electron microscopy.

Optically active counterions can surprisingly also be used during polymerization. Examples of such counterions are D- or L-camphorsulphonic acid, amino acids or e.g. optically active substituted aromatic sulphonic acids (such as e.g. para-sulphophenylalanine).

The subject of the invention is also the use of a dispersion as mentioned above or as obtained according to the above-mentioned process for the preparation of shaped parts (moulded goods), self-supporting foils or coatings with electrical conductivity.

Further preferred embodiments of the present invention result from the dependent claims.

Figure 1:
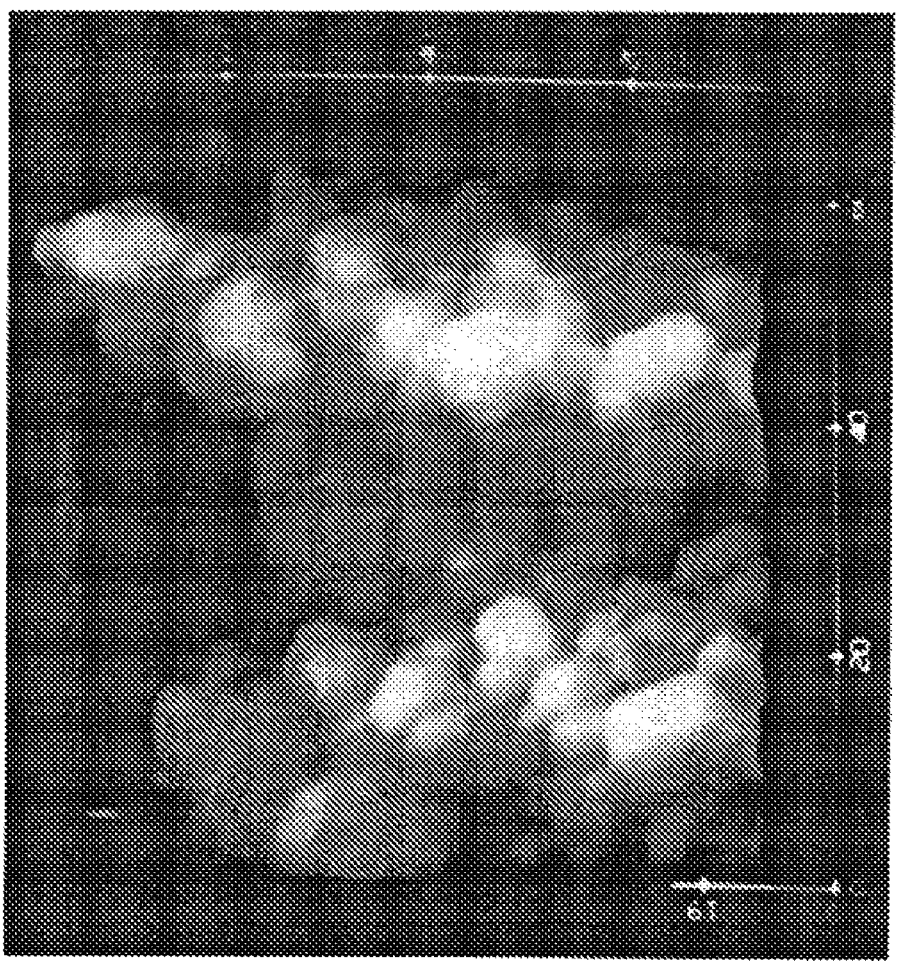
FIG. 1 is a scanning tunneling microscope picture which shows agglomerates of spherical primary particles of polyaniline whose size is approximately 10 nm.
Figure 2:
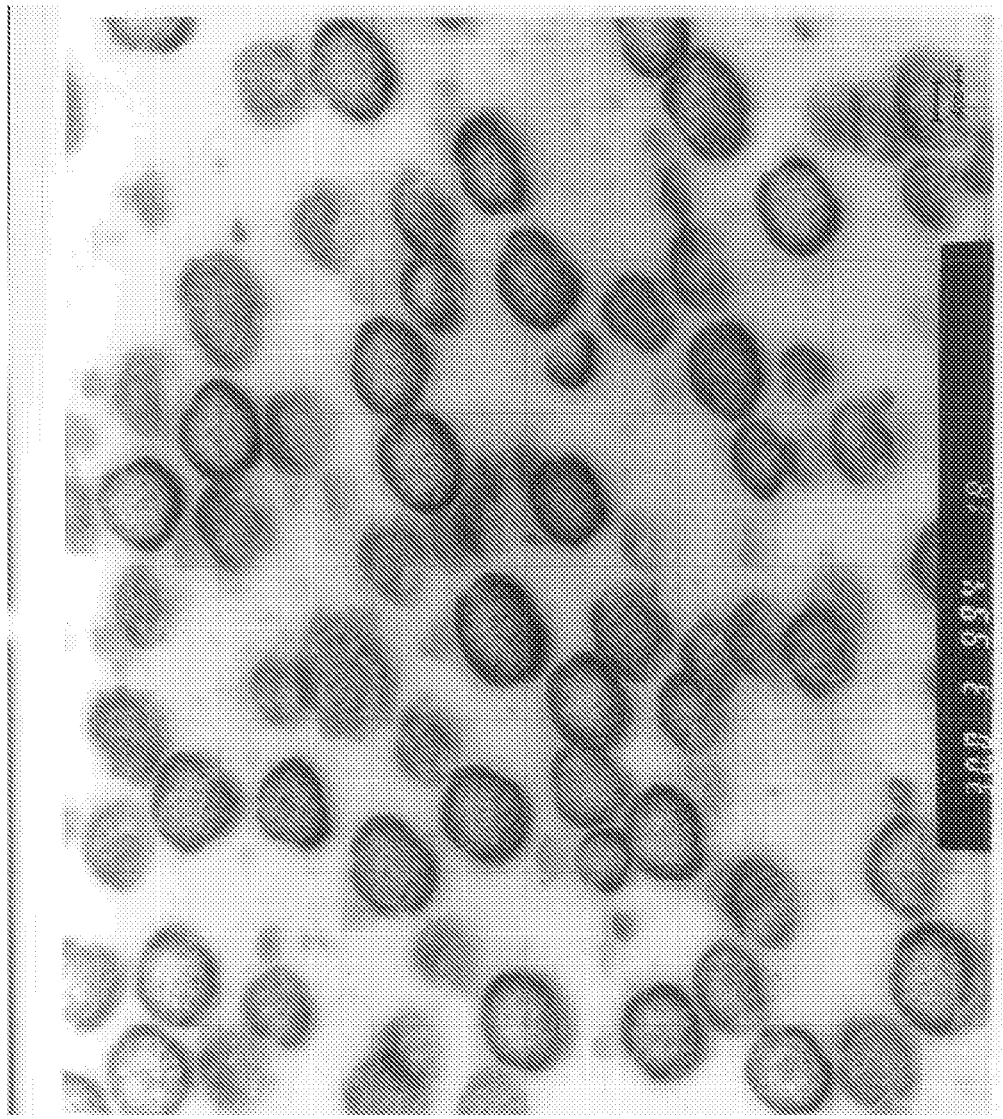
FIG. 2 is a transmission electron microscope picture which shows the structure of polyaniline secondary particles with a size of approximately 100 to 150 nm, with a fine structure of spherical primary particles of a size of approximately 10 nm.
Figure 3:
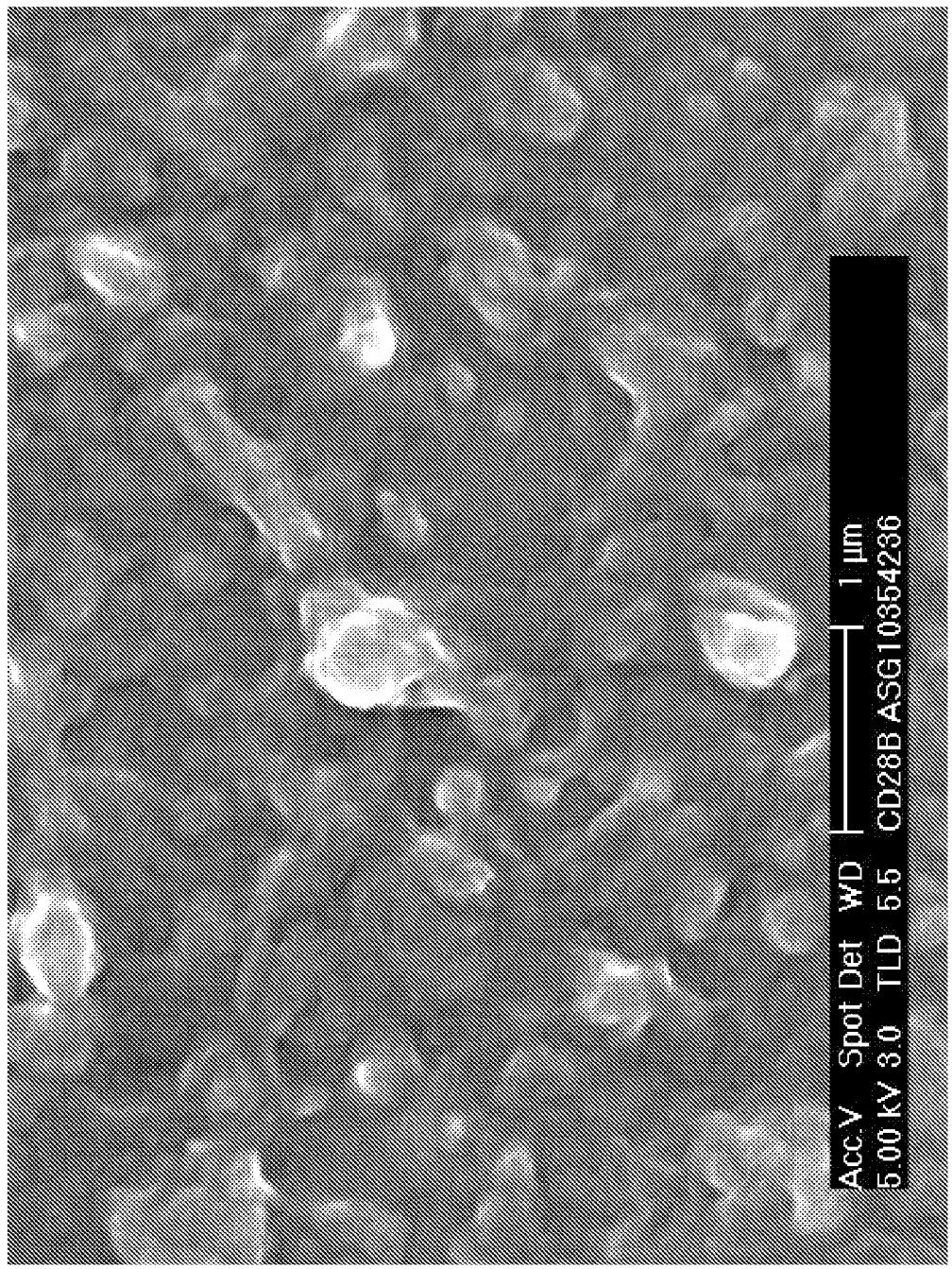
FIG. 3 is a scanning electron microscope picture of a foil which has been cast from a polyaniline dispersion and then dried, which consisted of spherical primary particles. It is seen that a spherical secondary or tertiary morphology is also present after the drying.
Figure 4:
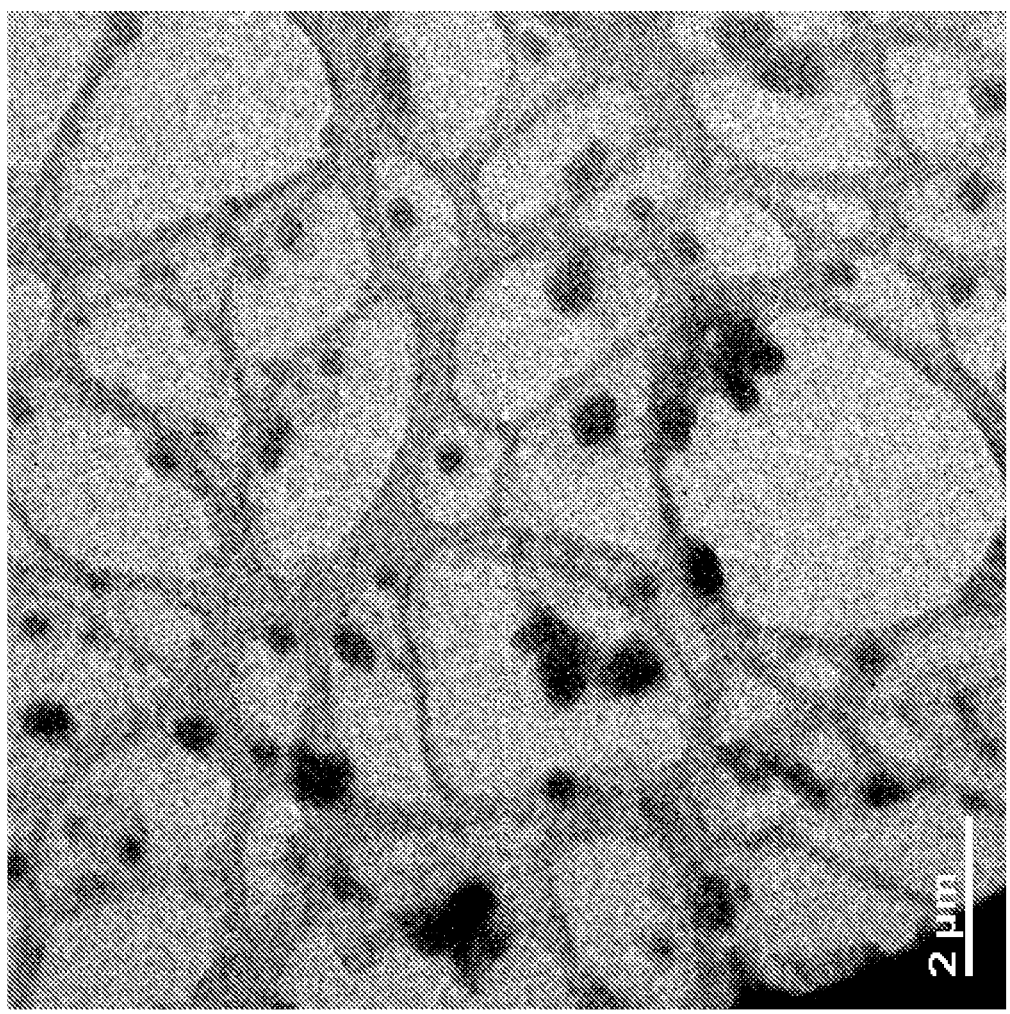
FIG. 4 is a transmission electron microscope picture of polyaniline particles deposited from a dispersion based on xylene, which in addition to amorphous drying residues shows spherical primary and secondary particles.
Figure 5:
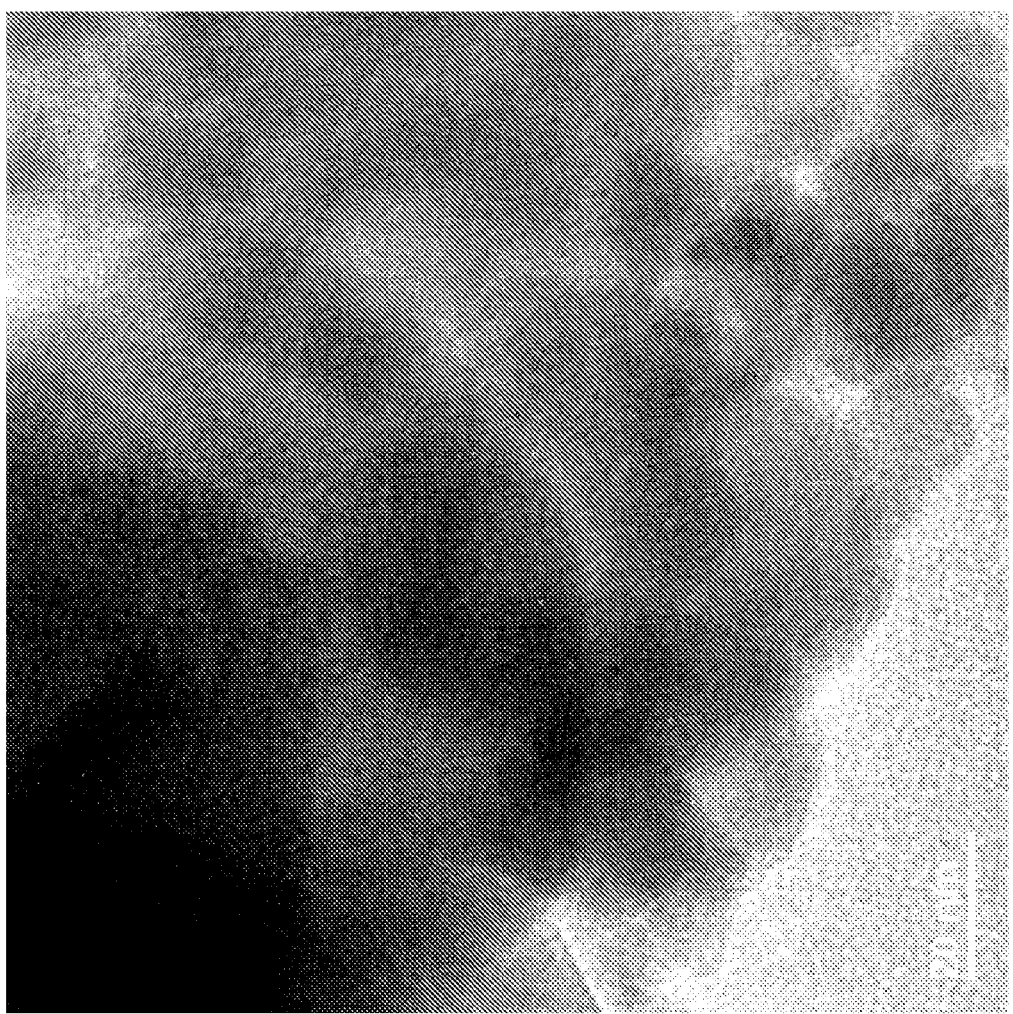
FIG. 5 is a high-resolution transmission electron microscope picture which shows primary particles, lying on top of one another, deposited from a dispersion of polyaniline.

The term "conductive polymer" as used in the present application includes both intrinsically conductive polymers and also the so-called organic metals, as mentioned at the outset.

By "primary particles" are meant in the present application the smallest morphological unit occurring in isolation in the dispersion or recognizable in the scanning or transmission electron microscope, i.e. supermolecular structural unit, of a conductive polymer.

By "secondary particles" or "secondary structure" is meant the higher structures (secondary and also tertiary structures), which result from the accumulation (agglomeration) of primary particles among one another. By "aggregate" is meant the congregation brought about by coalescence and stabilized by material bridges of primary particles. By "agglomerate" is thus meant only the coalescence comprising substantially punctiform contacts of primary particles. Agglomerates may be destroyed in a substrate and dispersed as primary particles, but in the case of aggregates this no longer occurs without breaking up chemical bonds. This delimitation is customary in pigment technology (see Herbst/Hunger, "Industrielle Organische Pigmente", VCH 1987). It is also used here. It should particularly be borne in mind that earlier state of the art in this technical field does not always heed the above-described delimitation, but talks about "agglomerates" without any distinction being made.

The success achieved according to the invention is therefore to be seen as surprising in particular because the dispersion processes in themselves have no preferred direction and therefore it is not to be expected that a morphology results which deviates from the sphere morphology (which in the crude state is present directly after polymerization, before the first dispersion step). Also, the fact that optically active counterions which are used during polymerization favour the creation of anisotropic primary particles is extremely surprising. Although conductive polymers with optically active counterions have already been described, no deviating primary morphology whatever has been observed.

The success achieved according to the invention is also surprising because generally a dispersion process is viewed as harmful for the conductivity of the polymer. Most experts presume that the chains of the conductive polymers are torn during dispersion, with the result that electron conduction (along these chains) is made worse. Therefore, as stated above in the state of the art, it is attempted to prepare true solutions of conductive polymers from then. In addition the use of dispersants and additives is also generally viewed as disadvantageous, as they can raise and strengthen the barriers to transport of the electrons. In the process according to the invention indeed, two dispersion steps are actually preferred.

Finally, it is to be seen as surprising that in the process according to the invention, after the first dispersion stage (stage (b)) a complete removal of the optionally present non-conductive polymer is not actually essential as is explained in more detail below, before the second dispersion step optionally to be carried out.

A series of advantages result from this invention, such as e.g. the possibility of achieving a preferred direction of conductivity, or other (i.a. optical or mechanical) properties, of preparing stretched foils and fibres with increased conductivity (and optionally also increased mechanical load carrying ability) or also of depositing conductive polymers in anisotropic surroundings (thus e.g. in electrical or magnetic fields or anisotropically structured substrates) and in so doing achieving improvements in properties.

Without wishing to be bound to a specific theory, it is assumed that the particle morphology according to the invention results because the dispersion processes, through being carried out at the lowest possible temperature, produce minimal differences in the flow direction and thereby preferred directions of the force acting on the particles which could lead to an anisotropic deformation of the primary particles. The temperature programme according to the invention proposed during polymerization could be helpful here in so far as a degree of ordering of the chains perhaps results which is advantageous for the later anisotropic shaping. The use of optically active counterions could lead in the same direction.

The dispersions comprising the conductive polymers according to the invention also have the advantage of being stable. Stable dispersions according to the invention need therefore not be further processed immediately after their preparation or at least after a short time, but can be stored over a longer time, e.g. over several hours, e.g. 5-10 hours, or days, e.g. 1-3 days or 4-6 days, or weeks, e.g. more than one week to several months, e.g. more than 1 month, preferably more than 3 months. The above storage details relate to ambient conditions. By "ambient conditions" is meant in particular that the temperature is approximately room temperature, i.e. approximately 5 to 25° C., and the pressure is approximately normal pressure, i.e. 1013 kPa. It is however clear to a person skilled in the art that, depending on the location of the storage, the above statements also relate to slightly deviating typical ambient conditions.

Examples of intrinsically conductive polymers or organic metals according to the invention are those named at the outset of this description. In particular there can be named as examples: polyaniline (PAni), polythiophene (PTh), poly(3,4-ethylene dioxythiophene) (PEDT), polydiacetylene, polyacetylene (PAc), polypyrrole (PPy), polyisothianaphthene (PITN), polyheteroarylenevinylene (PArV), wherein the heteroarylene group can be e.g. thiophene, furan or pyrrole, poly-p-phenylene (PpP), polyphenylene sulphide (PPS), polyperinaphthalene (PPN), polyphthalocyanine (PPc) and others, and their derivatives (which are formed e.g. from monomers substituted by side chains or groups), their copolymers and their physical mixtures. Polyaniline (PAni), polythiophene (PTh), poly(3,4-ethylene dioxythiophene) (PEDT), polythieno-thiophene (PTT) and derivatives thereof are particularly preferred. Preferred binary mixtures of the intrinsically conductive polymers are mixtures of PAni and PTh, PAni and PEDT, PAni and PPy, PEDT and PPy and PEDT and PTh. Polyaniline is most preferred.

In stage (a) of the process according to the invention, dispersible, intrinsically conductive polymer preferably polyaniline, is generally prepared as prescribed in EP-A-0 329 768. Reference is made in particular to the definitions used in EP-A-0 329 768. These also apply here in connection with the carrying out of stage (a) of the process according to the invention.

The temperature is preferably controlled in stage (a) of the process according to the invention, thus during the polymerization, such that, unlike the process of EP-A-0 329 768, during polymerization the temperature does not rise above a value more than 1° C. above the starting temperature, and at no time during the polymerization is the rate of the temperature rise more than 1 K/Minute. The reaction is preferably operated such that the temperature rise is <0.5° C., wherein the rate of the temperature rise is at no time more than 0.2 K/min.

The cooling necessary to control temperature can generally be obtained with cooling rates of at least 0.02 K/min, preferably 0.05 K/min. The cooling rates are determined by measuring the temperature change during activated cooling at the reactors used in each case, without the reaction being started up.

The (intermediate) products obtained according to the invention after stage (a) generally have a conductivity of approximately 5 S/cm.

The intermediate products from stage (a) generally occur as powder, wherein 80 wt.-% of the primary particles are smaller than 500 nm and wherein not more than 20 wt.-% are aggregated into aggregates of more than 1 μm. This can be seen from scanning electron microscope pictures of the dried solid and light-microscope examinations of dispersions in polymer blends. Their primary particle morphology continues to be substantially spherical.

The light-microscope examination takes place by dispersing the solid according to the invention directly or as concentrate with the help of an internal mixer in a test polymer. PCL or PVC are suitable as test polymers. The concentration of the substance to be to dispersed is usually 0.5 wt.-%. The mixture is extruded to form a thin film. With raw materials according to the invention a uniformly strongly coloured, semi-transparent substance is recognized; the colouring comes from the dispersed primary particles. Also, in some cases undispersed particles of 0.5-1 µm and individual coarser particles are recognized.

After polymerization and working up—wherein it is not important whether the obtained polymer is or is not already completely dry—in stage (b) of the process according to the invention the polymer is dispersed in the presence of a non-polymeric polar substance or ground with same. The polar substance (which could also be called "dispersion auxiliary") has the following properties:

it has a surface tension of more than 30 dyne/cm,
it is not electrically conductive (i.e. it has an electrical conductivity of less than $10^{-6}$ S/cm),
it can be liquid or solid,
it is inert vis-à-vis the conductive polymer used, i.e. does not participate in any significant chemical reactions with same; above all oxidative or reductive and acid-base reactions are not desired,
under normal conditions it is not necessarily a dispersion auxiliary and does not come under the materials class of the surfactants.

Examples of such polar substances are
a) solids: barium sulphate; titanium dioxide, in particular ultrafine titanium dioxide with a particle size of less than 300 nm; organic pigments such as pigment yellow 18;
b) inert solvents: water, DMF, DMSO, γ-butyrolactone, NMP and other pyrrolidone derivatives, e.g. n-methyl-2-pyrrolidone, dioxane, THF;

wherein this list is by way of example and in no way limitative.

The dispersion or the grinding with the polar substance can generally be carried out in dispersion devices such as high-speed mixers (e.g. so-called fluid mixers) or under ultrasound, in a ball mill, bead mill, a two- or three-roll mill or a high-pressure dispersion device (Microfluidics type).

In high-speed mixers or under ultrasound the processing time is at least 3 minutes. In ball mills, on two- or three-roll mills or in other units with a high shearing force a longer treatment time, e.g. of at least 30 minutes, is required. The simultaneous use of an electric field, in particular a rectified electric field, can be advantageous; in this case more than 24 hours is required in most instances.

The polar, non-conductive substance inert vis-à-vis the intrinsically conductive polymer is used in such a quantity that a weight ratio of 2:1 to 1:10 results between the conductive polymer powder and the polar substance.

Preferably, when carrying out stage (b) at least a non-conductive polymer, in particular a thermoplastic polymer, is also present. For example polyethylene terephthalate copolymer, commercially available from Eastman Kodak or from Degussa, or a polymethyl methacrylate (PMMA) from Degussa can be used. The presence of the thermoplastic polymer requires the dispersion to be carried out under high shear and at temperatures below 250° C., preferably below 180° C. and particularly preferably at temperatures below 100° C., at the same time 5 to at most 80° C. above the glass-transition point of the non-conductive polymer.

After cooling, a solid mixture, a polymer blend, is then obtained, which contains between 20 and 60 wt.-%, preferably approximately 35 wt.-% conductive polymer, relative to the constituents of the product composition from stage (b) solid at room temperature, which comprises the conductive polymer, the polar substance and optionally a further non-conductive polymer. After carrying out stage (b), the conductive polymer generally has conductivities of approximately 60 S/cm.

After stage (b) the added polar, inert and non-conductive substance or the likewise present non-conductive polymer can be partially or almost completely removed by washing or extraction. Preferably this secondary treatment stage is carried out after the conclusion of stage (b) as described in the above paragraph. Alternatively the secondary treatment can also already start during stage (b).

The purpose of the secondary treatment, which could also be called conditioning of the product from stage (b) for the optionally further subsequent dispersion stage, is to prepare (condition) the product from stage (b) for the optionally subsequent dispersion stage. The most varied substances can be used for the washing or extracting, e.g. aromatics, alcohols, esters, ethers, ketones, e.g. xylene, toluene, ethanol, isopropanol, chlorobenzene, diisopropylether and the like. Solvents and auxiliaries can also be used which support the subsequent dispersion stage. These can e.g. be xylene or chlorobenzene and dodecylbenzene sulphonic acid (DBSH).

During the secondary treatment of the product from stage (b) the proportion of conductive polymer in the product is preferably increased, relative to the constituents of same that are solid at room temperature, by at least 5 wt.-%, preferably 10 wt.-%, in particular 20 wt.-%.

Alternatively, without reducing or removing the polar substance or the thermoplastic polymer, processing can continue, e.g. if the further processing and the use of the conductive polymer is not disturbed by the presence of the added substance. The conductivity of the polymer powder is not impaired by the presence of the polar substance or of the thermoplastic polymer.

Preferred concentrations of conductive polymer which are achieved after stage (b) and secondary treatment lie between 45 and 99 wt.-%, preferably 55 to 70 wt.-%, relative to the whole composition. For example the product from stage (b) can be a moist paste with a relatively high proportion of solvent or auxiliary which was used in secondary treatment. It is also not essential to the invention to very largely remove substances used during the secondary treatment before carrying out the further dispersion stage of the process according to the invention, but in industrial practice this can be advantageous.

The further dispersion stage of the process according to the invention is a dispersion which takes place in an organic or aqueous medium (dispersant) and is generally carried out at room temperature or an only insignificantly different temperature. There can be considered as dispersion aggregates such machines which can introduce high dispersion energy into the system. These can e.g. be units such as Ultraturrax, Disolver, bead mills, ball mills, high-pressure dispersion apparatuses such as those of the Microfluidics type, or ultrasound systems. The dispersion time can be several minutes, e.g. 20 minutes, up to several hours, e.g. 1 to 3 h, e.g. 2.5 h.

Suitable in particular as dispersants are solvents which have a surface tension of at least 25 mN/m. The dispersants according to the invention are liquid at room temperature and have in particular relative viscosities of <10,000, e.g. <5,000, and in particular <1,000.

Examples of dispersants according to the invention are xylene, chlorophenol, dichloroacetic acid, N-methylpyrrolidone, dimethylsulphoxide, octanol, or benzyl alcohol or higher alcohols, e.g. $C_9$-$C_{20}$ alcohols of paraffinic or aromatic nature, or mixtures of same.

The dispersant(s) is (are) added to the product from stage (b) of the process according to the invention in such a quantity that, relative to the intrinsically conductive polymer, there is an excess (weight ratio) of dispersant. In particular the weight ratio between the conductive polymer and the dispersant is smaller than 1:10, preferably smaller than 1:15, e.g. 1:18.

There is generally obtained as product of this dispersion stage a high-viscosity paste or a liquid, low-viscosity dispersion with a concentration of conductive polymer of generally not more than approximately 10 wt.-%, relative to the whole dispersion. The dispersion obtained after this dispersion stage preferably contains small proportions of the polar substances and non-conductive polymers used in stage (b), depending on the extent of the conditioning.

To prepare the use of the dispersion according to the invention when producing moulded goods, self-supporting foils or coatings with electrical conductivity, auxiliaries and additives can be added after the last-described dispersion stage or alternatively during this dispersion stage. These can be e.g. viscosity regulators, wetting aids, matrix polymers such as varnish binders, film-forming substances, stabilizers, wetting auxiliaries, evaporation regulators such as evaporation accelerators or evaporation retardants or further auxiliaries and additives. A stable dispersion is then obtained which contains all the components which are helpful or decisive to the further shaping and properties of the product.

The dispersion obtained after the dispersion, including secondary treatment and formulation, can then, optionally after carrying out further dispersion and secondary treatment steps, be used for the preparation of shaped parts (moulded goods), self-supporting foils or coatings of the most varied layer thickness with electric conductivity (shaping).

The shaping can take place through a series of processes, such as dipping, wetting by drips, spraying, spin coating, printing (e.g. silk-screen printing, offset printing, ink jet and others), extrusion, casting, knife coating, electrospinning, and others. The shaping is particularly preferably carried out by dipping, casting, drip-wetting, spin coating or printing.

After removing the dispersant, the thus-obtained layers, coatings, foils, sheets or other shaped parts or components have a conductivity of >100 S/cm, preferably at least 200 S/cm or greater, e.g. greater than 250 S/cm, in particular at least 500 S/cm, e.g. 200 to 200,000 S/cm, 200 to 20,000 S/cm or 500 to 10,000 S/cm, e.g. 300 to 3,000 or 500 to 1000 S/cm.

In addition, the particles of the dispersion according to the invention are characterized in that the X-ray diffractogram e.g. for polyaniline ("dosed" with p-toluene sulphonic acid) has no sharp reflexes and that at $2\theta$=approx. $3°$ a reflex is visible which in the case of polyaniline from dispersions according to the invention has just as high an intensity compared with the broad reflection at $2\theta$=approx. $19°$. Compared with this, the "crude" powder from stage (a) normally has no peak there or only very weak intensity, while the polyaniline after the first grinding/dispersion process according to stage (b) at any rate shows a clear reflection, but this is weaker compared with the peak at approx. $19°$.

After the second dispersion and only for dispersions which are carried out according to the invention and accordingly permit a conductivity of >100 S/cm, this reflex is clearly the strongest, and the other reflexes become increasingly weaker as conductivity rises.

Figure 6:
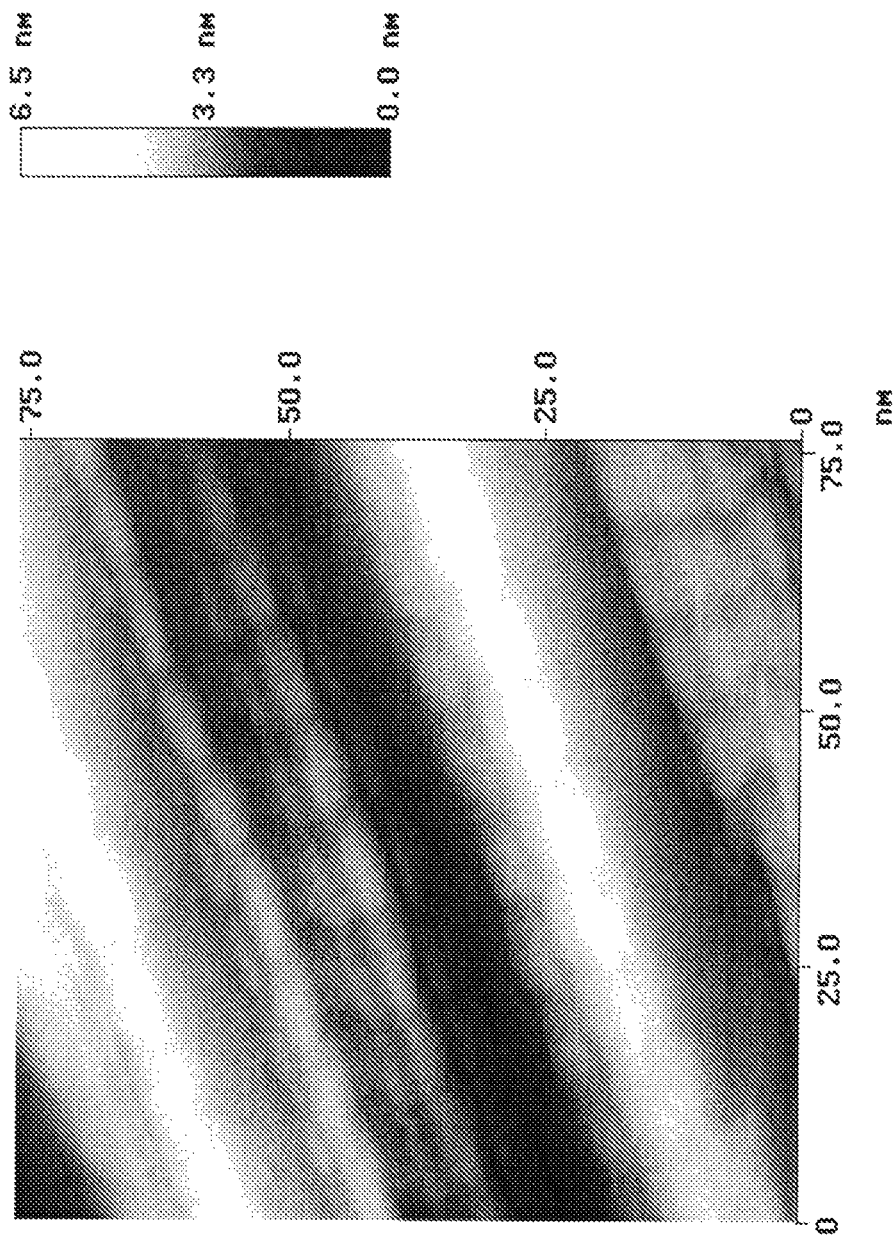
FIG. 6 shows a scanning force microscope picture of polyaniline primary particles ranged alongside one another with a morphology according to the invention.

Additionally, in scanning force microscope investigations it is found that the primary particles are clearly no longer spherical, but have a L/D ratio of approximately 2 and a length of approx. 8-11 nm and a width of approximately 4 nm (cf. FIG. 6).

Unlike conductive polymers/organic metals with an isotropic particle morphology, the shaping from anisotropic media such as e.g. liquid-crystalline (low- or high-molecular) substances or under the influence of anisotropic electric and/or magnetic fields or oriented or prestructured oriented substrates (such as HOPG, stretched oriented polypropylene or other plastic foils, preferably uniaxially stretched foils) is now possible and useful and permits the creation of shaped (moulded) parts and surface coatings with anisotropic properties. Thus, by deposition of polymer particles according to the invention onto an oriented substrate (e.g. oriented polypropylene) conductivities of approximately 1000 S/cm and above are achieved. Compared with this, in the case of deposition from the same dispersion on an isotropic substrate (e.g. glass), a conductivity of approximately 300 S/cm is achieved.

Antistatic or conductive coatings, transparent and non-trans-parent electrodes, varnishes which are suitable for EMI screening, contacts in electronics or "source", "drain" or "gate" in field effect transistors can be produced by shaping and further processing, as well as antennae, oscillating circuits, logic circuits, conductors or opposite poles in capacitors, electrolyte capacitors or so-called "supercapacitors" and many functions can be performed such as those which are performed in conventional electrical engineering and electronics by conventional metals, highly-doped semiconductors of electrodes or redox-active coatings.

The articles which are accessible by drying or by carrying out one of the above-described shaping processes and which contain the conductive polymer obtainable from the dispersion according to the invention are an embodiment of the invention. The above-named articles preferably consist substantially of the conductive polymer.

The novel primary particle morphology produces interesting advantages for numerous applications, generally due to the higher conductivity, wherein it is not a disadvantage that this is optionally higher than is customary in only one preferred direction (e.g. in EMI screening it is irrelevant whether the conductivity is isotropically or anisotropically high—the conductivity as such is decisive for the efficiency of the screening).

For some applications the novel morphology makes the use of the conductive polymers possible for the first time, thus in polymer electronics, in which "source", "drain" and "gate" are also possible with conductivities customary thus far, but the leads ("interconnects") to the organic field effect transistors and their wiring are carried out with vapour-deposited metals. The use of the conductive polymers/organic metals also results here for the first time, through increased conductivity in the direction of the "interconnects".

The following applications may be named by way of example:
  as electric conductors (e.g. electric contact, electric lead, as push-button switches, electrodes etc.) or semiconductors,
  as protection against static loads,
  to screen electromagnetic waves (EMI screening),
  to absorb microwaves (for screening or heating purposes),
  to produce capacitors or as a replacement for electrolytes in electrolyte capacitors,
  as electrodes or an electrode constituent in so-called "supercapacitors" (this type of capacitor is also called double-layer capacitor (DLC) and is characterized by the formation of an electric double layer, often based on carbon black and/or graphite. The term "electrochemical double layer capacitors" is also frequently used in English.), to produce semiconductor components such as diodes, transistors and others, as photoconductors or in photovoltaic energy conversion, in compositions with metals or semimetals or in compositions with different conductive polymers utilizing the thermoelectric effect as temperature sensors (IR absorption) or in thermovoltaic energy conversion, as sensors, as indicators, e.g. through electrochromism, microwave absorption, thermoelectric force etc., in electrolysis or electrosynthesis processes as electrocatalytic electrodes (e.g. in fuel cells), in photoelectrocatalysis or synthesis and in photovoltaic effects, in corrosion protection, e.g. in anodic corrosion protection, as electrodes in accumulators, as UV- and light-stable pigments.

as electrodes or leads in electroluminescence arrays (e.g. as non-transparent so-called "back" or as transparent so-called "front electrodes")

as a hole-injection layer or anodic buffer layer or as transparent anodes in organic/polymeric light-emitting diodes or solar cells.

The invention claimed is:

1. A conductive polymer comprising nanoscopic primary particles with a particle-size of less than 100 nm which have an anisotropic morphology which is not spherical and has a length-to-diameter ("L/D") ratio greater than 1.2, wherein the conductive polymer can be dispersed with a dispersant to form a dispersion and the conductive polymer being further characterized by a layer, foil or sheet formed from the dispersion having a conductivity of >100 S/cm after removal of the dispersant.

2. The polymer according to claim 1, characterized in that the conductivity of a layer, foil or sheet formed from the dispersion of the conductive polymer is greater than or equal to 200 S/cm after removal of the dispersant.

3. The polymer according to claim 2, characterized in that the conductivity of a layer, foil or sheet formed from the dispersion of the conductive polymer is 300 S/cm to 3000 S/cm after removal of the dispersant.

4. The polymer according to claim 1, characterized in that the polymer is selected from the group consisting of polyaniline, polythiophene, polythienothiophene, polypyrrole, copolymers of the monomers of these polymers and polymers or copolymers from the derivatives of these monomers.

5. The polymer according to claim 1 characterized in that it is present in a dispersion and the dispersant has a relative viscosity of <10,000.

6. A method of using a dispersion comprising:
providing a dispersion comprising a conductive polymer, the conductive polymer comprising nanoscopic primary particles with a particle-size of less than 100 nm which have an anisotropic morphology which is not spherical and having a length-to-diameter ("L/D") ratio greater than 1.2, the dispersion being further characterized by a layer, foil or sheet formed from the dispersion having a conductivity of >100 S/cm after removal of the dispersant; and
applying the dispersion to at least one of, a shaped part, self-supporting foil or coating with electrical conductivity.

7. The method of using a dispersion according to claim 6, characterized in that the shaped part, self-supporting foil or coating is at least one of an electrode, antenna, polymeric electronic component, capacitor and double-layer capacitor (DLC).

8. The method of using a dispersion according to claim 6, characterized in that the shaping takes place in at least one of anisotropic materials and anisotropic fields or the deposition is onto anisotropic substrates.

* * * * *